United States Patent [19]

Bridgewater

[11] 4,025,945

[45] May 24, 1977

[54] COLOR FUNCTION DISPLAY SYSTEM

[75] Inventor: Thomas Austin St. Clair Bridgewater, Indianapolis, Ind.

[73] Assignee: RCA Corporation, New York, N.Y.

[22] Filed: July 25, 1975

[21] Appl. No.: 599,257

[52] U.S. Cl. .................................. 358/1; 358/56; 358/194

[51] Int. Cl.² ...................................... H04N 9/02

[58] Field of Search .................. 358/56, 64, 22, 81, 358/82, 1; 178/DIG. 6, DIG. 15; 325/391, 392; 340/324 AD

[56] References Cited

UNITED STATES PATENTS

| | | |
|---|---|---|
| 3,624,634 | 11/1971 | Clark .............................. 358/81 X |
| 3,668,686 | 6/1972 | Strohmeyer ..................... 358/81 X |
| 3,749,823 | 7/1973 | Warner ............................... 358/81 |
| 3,849,793 | 11/1974 | Ablett ................................. 358/81 |
| 3,869,672 | 3/1975 | Schroder .......................... 325/392 |
| 3,886,588 | 5/1975 | Dalke ................................. 358/82 |

Primary Examiner—John C. Martin
Assistant Examiner—Mitchell Saffian
Attorney, Agent, or Firm—Eugene M. Whitacre; Paul J. Rasmussen

[57] ABSTRACT

Signals from a remote control transducer are decoded in a television receiver to cause display of characters in a predetermined color on a color display tube when a particular function control mode such as hue or saturation control is remotely selected.

4 Claims, 1 Drawing Figure

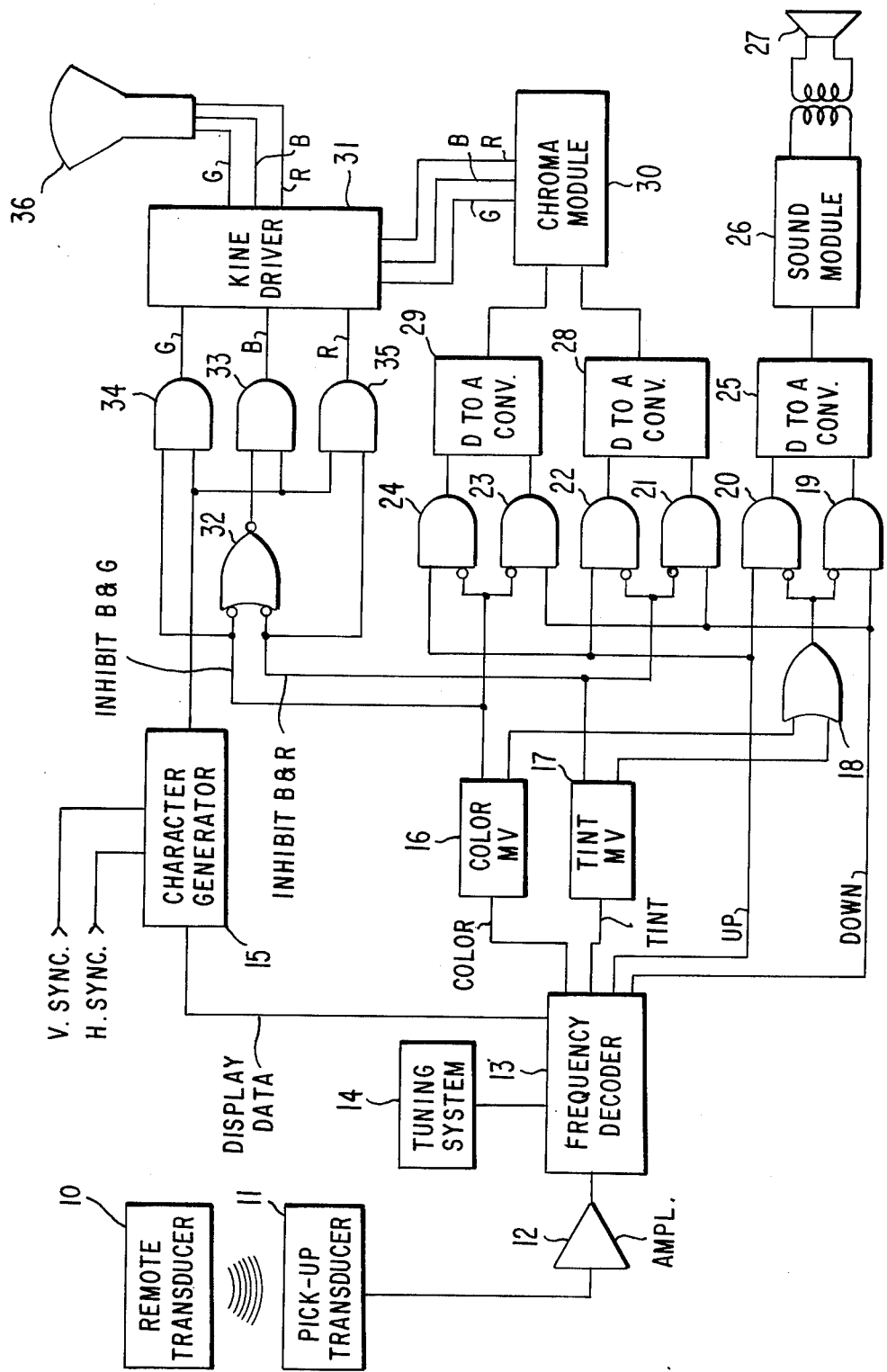

COLOR FUNCTION DISPLAY SYSTEM

BACKGROUND OF THE INVENTION

This invention relates to a color display system wherein a particular color display indicates a particular function selected for being remotely controlled.

In color display systems such as may be utilized in color television receivers controls are provided for the viewer to adjust picture characteristics such as brightness, color tint and color saturation as well as sound level to accommodate the viewer's preference or different signal characteristics occurring as programs or channels are changed. Normally these characteristics can be changed readily by adjusting identified controls usually located on the front of the television receiver. However, in television receivers adapted for remote control it is desirable to provide some means of visual feedback so the viewer may know quickly which function he is remotely controlling at a given instant. It is expected that when a viewer actuates a remote control labeled "tint," for example, that the tint of the picture should change. However, the viewer might actually engage the selected remote control longer than necessary in order to get a definite change in the picture to indicate that in fact the particular function was being changed. Hence the desirability of a positive visual feedback.

On-screen channel number displays have been utilized with remotely controlled television receivers so the viewer may readily determine to which channel the receiver is tuned. Such displays are generated by suitable character generators which are synchronized at the vertical and horizontal scanning rates and which provide the display information in a form which modulates the video signals to create the actual number display. While it is conceivable that display character generators could be built which could provide additional character display to indicate which control function was being activated at a particular time, such an arrangement would increase the complexity of the character generator as well as its addressing circuits and most likely increase the number of pin connections between the addressing, character generating and display circuits. Such a complex arrangement is undesirable from reliability and cost points of view.

SUMMARY OF THE INVENTION

A color function display system includes means for generating coded signals representative of data to be displayed on a color picture tube and particular color in which the data is to be displayed, which color represents a particular function control enabled mode of the system. A character generator means and enabling means responsive to the coded signals provide, respectively, video signals representative of the data and color control signals. Color video signal generating means responsive to the video signals and color control signals provides particular color representative signals so that the data may be displayed in color representative of the particular function control enabled mode.

A more complete description is given in the following description and accompanying drawing in which the sole FIGURE is a block circuit diagram of a portion of a remote controlled color television receiver embodying the invention.

DESCRIPTION OF THE INVENTION

A remote transducer 10 comprises any suitable remote transmitting transducer which selectively transmits any one of a plurality of ultrasonic frequencies. There may be, for example, up to 14 different frequencies in the range of approximately 30–40 KHz. The ultrasonic frequencies transmitted by transducer 10 are received by a suitable pickup transducer 11 which, along with the rest of the elements in the drawing, are contained in a color television receiver. Signals from transducer 11 are suitably amplified, filtered and limited by amplifier 12 and coupled to a frequency decoder 13. Frequency decoder 13 converts each of the received ultrasonic frequencies to a particular binary code. Binary codes indicative of the television channel selected are coupled to tuning system 14 for conversion to appropriate signals which control the tuning of VHF and UHF tuners to enable reception of a desired television signal.

Binary data also indicative of a particular television channel is coupled from frequency decoder 13 to form a display data input of a suitable character generator 15. Character generator 15 is synchronized by vertical and horizontal scanning rate signals to cause the display data to appear in a particular segment of the viewing screen of a color television picture tube. For purposes of explanation, it is presumed that the data to be displayed comprises television channel numbers. However, it is to be understood that other information such as the time of day could be applied to the character generator for suitable conversion to video signal format so it can be utilized by the video driver circuits of the receiver. The channel display video signals from character generator 15 are coupled to an input terminal of each of an AND gate 34, an AND gate 33, and an AND gate 35, the outputs of which respectively provide green, blue and red channel number representative video signals.

Another frequency received by frequency decoder 13 is converted to a binary code which is coupled to a color multivibrator 16. Still another frequency is converted to another binary code which is coupled to a tint multivibrator 17. Additional different frequencies are converted to binary codes which are respectively coupled to first input terminals of AND gates 20, 22 and 24 and a binary code coupled to first input terminals of AND gates 19, 21 and 23. These last-mentioned two codes labeled "up" and "down" in the drawing will control the volume, color saturation and hue (tint) values of the television receiver. When neither the color multivibrator 16 or the tint multivibrator 17 are activated, meaning a 1 logic level on the top output line and a 0 logic level on the bottom output line, the output terminals therefrom coupled to an OR gate 18 enable AND gates 19 and 20. Thus, a command on the "up" or "down" input terminals of AND gate 19 or 20 will cause the particular AND gate to pass the binary signal which is applied to a suitable digital-to-analog converter 25 which then provides an increasing or decreasing level analog signal to control the gain of a sound module 26 which provides audio signals to a loudspeaker 27.

Assuming still that there is no color or tint code applied to multivibrators 16 or 17 from output terminals which are coupled through lines respectively labeled "inhibit B and G" and "inhibit B and R" are at a logic level to pass through OR gate 32 to enable AND gate 33. The absence of an inhibit B and G signal provides a logic level which enables AND gate 34. The absence of an inhibit B and R signal provides a logic level which enables AND gate 35. Thus in this mode, channel number representative video signals obtained from character generator 15 and coupled to AND gates 33, 34 and 35 pass through all of the gates to provide drive signals to the red, blue and green video drive signals to kinedriver 31. Kinedriver 31 in turn provides suitable signals to all of the green, blue and red drive electrodes of a color television picture tube 36. With all of the green, blue and red drive electrodes receiving the channel number video signals, those signals will be displayed in white on the viewing screen and picture tube 36. Thus, when the sound volume is being adjusted, the channel numbers appear in white letters on the kinescope, providing a visual feedback to the viewer who controls the "up" and "down" buttons of remote transducer 10 that he is in fact controlling the volume. This is confirmed because the volume control "up" and "down" buttons may be colored white on the remote transducer 10.

When it is desired to change the color saturation of the reproduced television picture, the color button on remote transducer 10 is actuated by the operator and a signal obtained from frequency decoder 13 enables the start of color multivibrator 16 meaning a 0 logic level on the top line and a 1 logic level on the bottom line. The change in logic level at the output terminal of color multivibrator 16 is passed through OR gate 18 to disable the sound control AND gates 19 and 20. This logic level also is passed through OR gate 32 to inhibit the blue color AND gate 33 and also inhibits the green color AND gate 34, thus preventing any channel number representative video signals from being passed through the blue or green AND gates 33 and 34, respectively. However, the red AND gate 35 is still enabled and passes the channel number representative video signals through the red AND gate 35 to enable the red kinedriver stage to drive kinescope 36. This results in the channel numbers being displayed in red on the viewing screen while the color function control mode is enabled.

Simultaneously, while the color multivibrator 16 is in its active state, it enables color AND gates 23 and 24. Thus, following the operator selection of the color function control mode if either the "up" or "down" controls are activated, binary code from frequency decoder 13 are passed through AND gate 24 or AND gate 23, respectively. The binary code obtained from either AND gate 23 or 24 is converted to an analog signal by the digital-to-analog converter 29 and this color control analog signal is coupled to a chroma module 30 to control the saturation of the displayed picture by coupling appropriate analog signals from the G, B, R terminals of chroma module 30 to the corresponding stages in kinedriver 31. It is noted that although the channel numbers in the color mode are displayed in red, the rest of the screen displays the normal received video. Thus, the red channel number displayed on picture tube 35 gives the viewer the indication and confidence that he is controlling the color saturation of the picture by actuating the "up" or "down" buttons while in the color mode. After a preselected time, color multivibrator 16 returns to its off state so that the receiver does not remain in the color function enabled mode once the desired color change has been made.

The tint control enabling a display function operates similarly to the color function control enabling portion of the invention. When the operator presses the tint control function on remote transducer 10, tint multivibrator 17 changes state, i.e., providing a 0 logic level on the top line and a 1 logic level on the bottom line, and provides a signal coupled through OR gate 18 to disable the sound control AND gates 19 and 20. At the same time, tint multivibrator 17 provides an inhibit signal on the inhibit B and R line which is coupled through OR gate 32 to disable the blue AND gate 33 and which is coupled to also disable the red AND gate 35. Green AND gate 34 remains enabled and therefore channel number representative video signals are passed through green AND gate 34 to activate the green video stage in kinedriver 31 to provide the display of the channel number in green on picture tube 36. This green channel number display clearly indicates to the operator that he is now in a tint control enabled mode.

While in the tint control enabled mode the operator may selectively press the "up" or "down" controls on remote transducer 10 and cause an "up" or "down" coded signal to appear at the output of frequency decoder 13 which will pass through respective AND gates 22 or 21 which have been enabled by the tint multivibrator 17. The digital signals appearing at the output terminals of either of the tint AND gates 21 or 22 provides a signal which is converted by digital-to-analog converter 28 to a varying analog signal which is coupled to chroma module 30 to control the color tint or hue of the television picture. Tint multivibrator 17 returns to its inactivated state at a predetermined time after the operator completes the adjustment.

The color function display system operates to decode command signals from the romote transducer to not only control the color, tint and sound characteristics of the television receiver, but also through the described enabling circuits to provide a positive visual feedback to the operator that he is in fact in a particular selected control mode by displaying channel numbers in a particular color keyed to the control functions on the remote transducer.

What is claimed is:

1. A color function display system, comprising:
    means for generating coded signals representative of data and representative of a color indicating a particular function enabled mode to be displayed on a color display tube;
    character generator means coupled to said means for generating coded signals and responsive to said coded signals for generating video signals representative of said data;
    enabling means coupled to said means for generating coded signals and responsive to said coded signals for generating a color enabling signal; and
    color video signal generating means coupled to said character generator means and said enabling means and responsive to said video signals representative of said data and responsive to said color enabling signal for producing color representative signals for displaying said data in said color representative of said function enabled mode.

2. A color function display system according to claim 1 wherein said means for generating coded signals include remote transducer means for transmitting selected frequencies representative of particular data and particular functions to be enabled and receiving means for converting said selected frequencies to said coded signals in digital form for activating said character generator means and said enabling means, said enabling means producing analog signals in response to said coded signals in digital form for activating said color video signal generating means.

3. A color functon display system according to claim 2 wherein said enabling means in response to said digital signals selectively activates said color video signal generating means for producing said displayed data in a selected one of a plurality of colors representative of a particular function enabled mode selected at said remote transducer.

4. A color function display system according to claim 3 wherein said color video signal generating means, in response to said analog signals, selectively controls one of a plurality of functions including picture color saturation or picture hue.

* * * * *